United States Patent [19]
Wilson

[11] Patent Number: 5,171,054
[45] Date of Patent: Dec. 15, 1992

[54] REAR SHELF MODULE FOR MOTOR VEHICLE

[75] Inventor: Phillip S. Wilson, Dover, N.H.

[73] Assignee: Davidson Textron Inc., Dover, N.H.

[21] Appl. No.: 811,656

[22] Filed: Dec. 23, 1991

[51] Int. Cl.[5] .............................................. B60R 27/00
[52] U.S. Cl. ................................ 296/37.16; 296/197; 296/901
[58] Field of Search ............... 296/37.8, 37.16 O, 901, 296/190, 197; 180/90

[56] References Cited

U.S. PATENT DOCUMENTS

| | | | |
|---|---|---|---|
| 4,670,324 | 6/1987 | Sato et al. ........................... | 296/37.8 |
| 5,005,898 | 4/1991 | Benedetto et al. .................. | 296/197 |
| 5,088,571 | 2/1992 | Burry et al. ......................... | 296/70 |

Primary Examiner—Robert R. Song
Attorney, Agent, or Firm—Reising, Ethington, Barnard, Perry & Milton

[57] ABSTRACT

A rear shelf module for a passenger car includes a plurality of transverse reinforcing channels forming electrical cable ducts or air conditioning ducts through the module for locating electrical conduits for connection to rear light and sound system components located respectively in fore and aft facing housing segments formed integrally of the rear shelf module and for directing heating, air conditioning and ventilation air to the rear passenger compartment.

7 Claims, 4 Drawing Sheets

REAR SHELF MODULE FOR MOTOR VEHICLE

FIELD OF THE INVENTION

This invention relates to rear seat package shelves for motor vehicles and more particularly to such package shelves that form a cross brace component of the vehicle rearwardly of a rear seat assembly.

BACKGROUND OF THE INVENTION

Present day interior automotive deck assemblies have a multi-layered construction including a layer of sound and heat insulation fastened to a light structural panel of low cost material such as wood or cardboard forming a package shelf. The package shelf is covered with a finish material such as cloth, carpeting or embossed vinyl by suitable fasteners such as an adhesive layer or by staples or the like. A stamped metal beam is connected to the interior of the package shelf to reinforce it and to support the weight of other component assemblies associated with such rear shelving. Such component assemblies include rear facing brake light assemblies with housing, light sockets and lens; sound systems including speakers and grills; ventilation ducts for supplying fresh air from the front of the vehicle to rear passenger compartment; and electrical ducts through which wiring can be directed to the various electrically energizable components on the deck assembly.

Such prior art automotive deck assemblies require different tooling for the rear brake light housing; the housing for the sound system speakers and the housing for the ductwork. Additionally, the individually fabricated components require considerable assembly time to install on the metal frame. Such built-up assemblies also can produce squeaks and rattles that are unacceptable in world class manufactured passenger vehicles. Furthermore, such separately assembled housings unnecessarily increase the weight of a rear package shelf assembly.

SUMMARY OF THE INVENTION

The present invention provides a single unitary blow-molded module including a package shelf portion extending across the back of a rear seat assembly in a passenger compartment; housings are integrally connected to the shelf portion for enclosing either or both rear brake light assemblies and speakers or resonators of a sound system; and box frame ducts are formed integrally of the shelf portion for channeling electrical wiring to electrically connect components of the brake light assembly and the speakers to a suitable power source or for passing heating, air conditioning or ventilating air to air outlets in the rear compartment of a passenger car.

An object of the invention is to provide a single modular member forming a package shelf with integral housings for both rear brake lights and rear speakers in a passenger car.

A further object of the invention is to provide such a modular member with integral box frame ducts that will reinforce the rear shelf of a passenger car while defining paths for wiring to rearwardly facing brake light assemblies and sound system speakers.

A still further object of the invention is to provide a blow-molded part of light weight that forms a unitary rear package shelf, duct work, and housings for rear speaker assemblies in a passenger car and that alternatively includes a housing for a rear brake light. A decorative covering such as fabric, carpet or vinyl skin may be integrally bonded to the top surface of the shelf during the molding process or post applied.

DESCRIPTION OF THE PREFERRED EMBODIMENT

Figure 1:
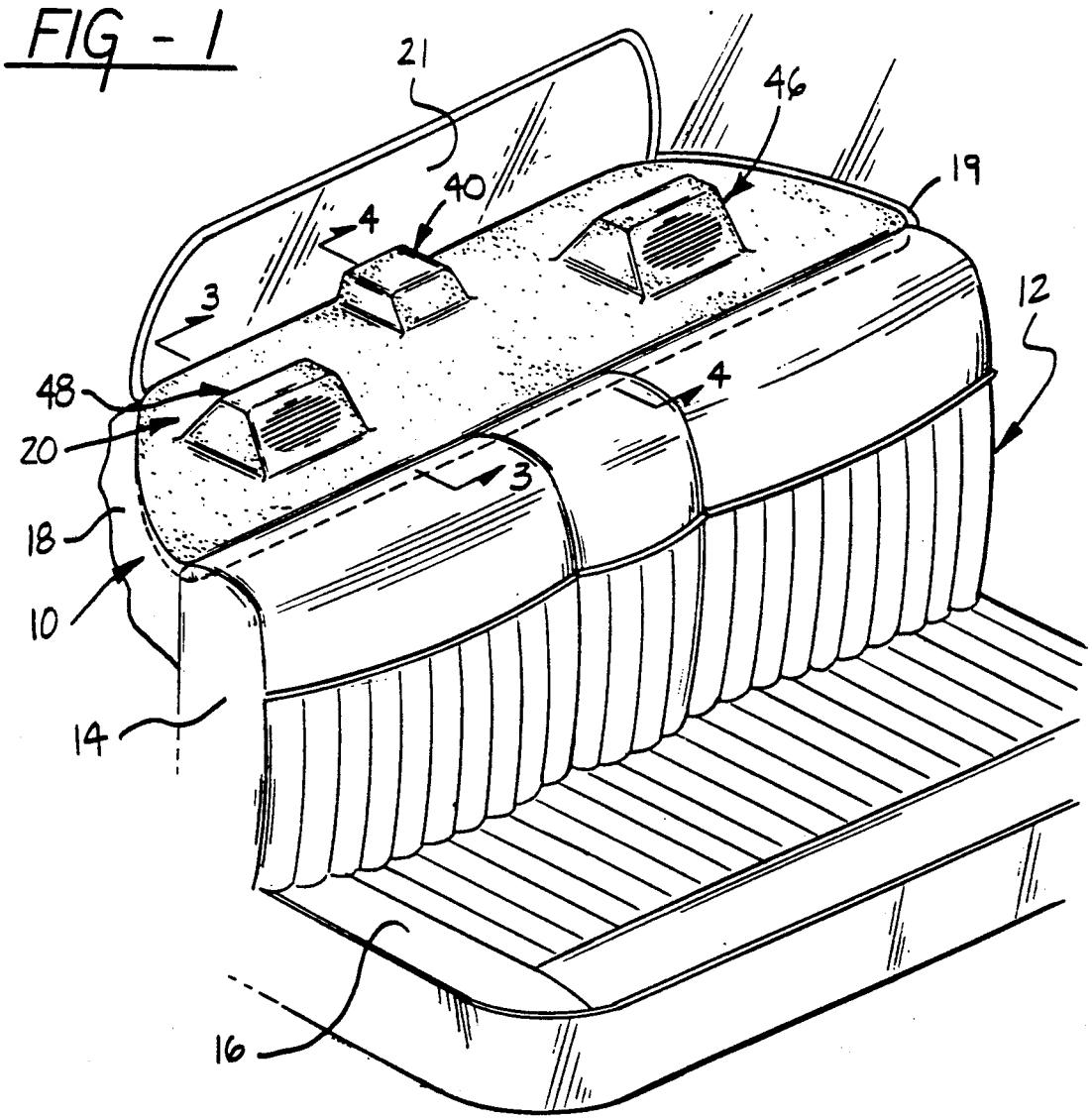
FIG. 1 is a schematic view of the rear compartment of a passenger car showing an exterior perspective view of the modular shelf assembly of the present invention.

Referring now to FIG. 1 a rear compartment of a passenger car 10 is shown. The rear compartment includes a rear seat assembly 12 having a raised seat back 14 and a slightly forwardly raised seat cushion 16. The rear seat assembly 12 is located forwardly of a trunk space 18 formed in part by a trunk frame 19.

In accordance with the present invention a single unitary rear shelf module 20 is mounted in the rear compartment between the rear seat assembly 12 and the trunk space 18 at a point immediately below a rear window 21 of the vehicle for purposes to be described. The single unitary shelf module 20 has an integral shelf surface 22 that is covered either with a molded in place cover 24 or a cover which is adhered to the surface 22 following the molding process.

While the single unitary shelf module 20 can be formed by other molding techniques it has substantial areas thereon that are best formed by blow molding techniques. To this end and in accordance with the present invention blow molding apparatus 25 directs a parison 26 against a first die part 28 having a flat surface portion 28a with plural formations 28b, 28c and 28d. The parison is formed of synthetic resin material and is deformed along the die by pressurized air blown into the parison after which the parison is cooled and hardened to form a upper portion 20a of the unitary module 20. A parison also is formed against a second die part 30 having two transverse channels 32, 34 formed therein extending substantially side to side of the die part 30 to form a lower portion 20b of the single unitary module 20.

The upper portion and lower portions 20a, 20b are joined together to form the single unitary shelf module 20.

Figure 3:
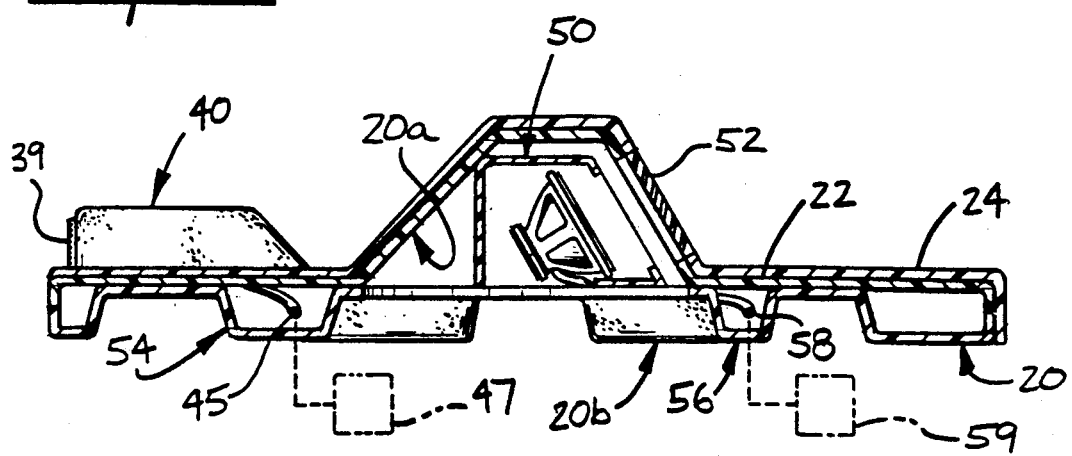
FIG. 3 is an enlarged cross-sectional view of the modular shelf assembly of the present invention taken along the line 3—3 of FIG. 1 looking in the direction of the arrows.
Figure 4:
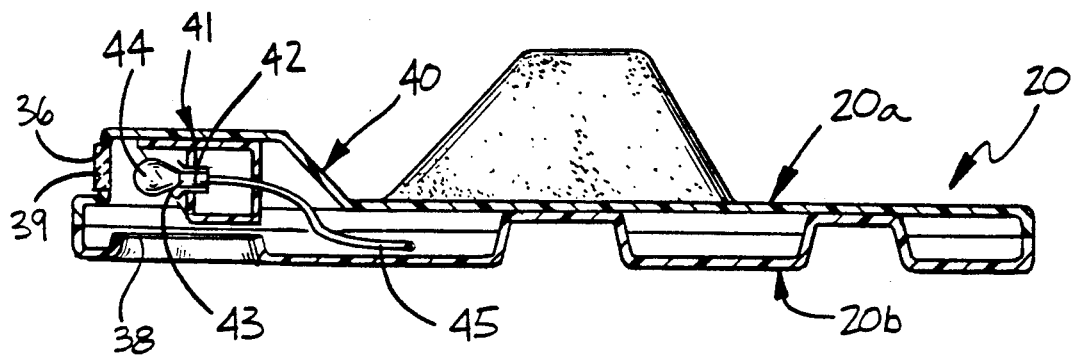
FIG. 4 is an enlarged cross-sectional view of the modular shelf assembly of the present invention taken along the line 4—4 of FIG. 1 looking in the direction of the arrows.
Figure 2:
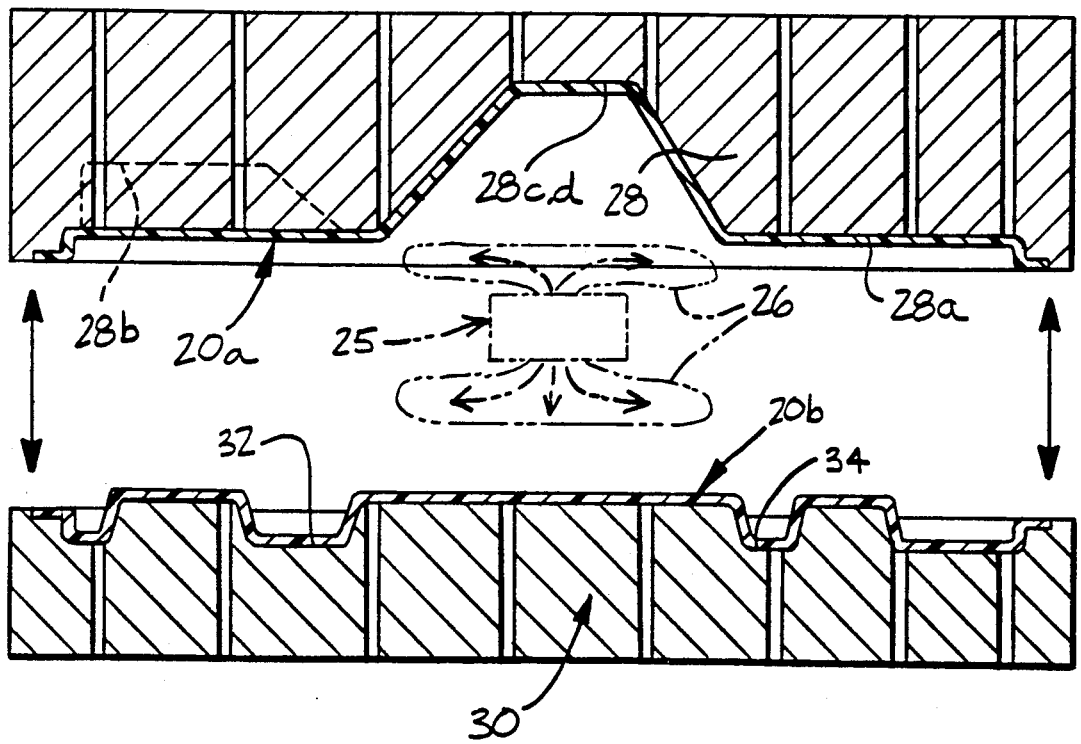
FIG. 2 is an enlarged cross-sectional view of die parts for blow molding the modular shelf assembly of FIG. 1.

As is best seen in FIGS. 1, 3, and 4, the shelf module 20 has an integrally formed rear brake housing 40. Housing 40 has a rear opening 36 and has a bottom access opening 38 for insertion of a rear brake lamp assembly 41 including a mounting member 42. The mounting member 42 has a lamp socket 43 of the bayonet connection type. It receives the base of a lamp 44 which is electrically connected to suitable wiring 45 electrically connected to the socket 43. A light dispersing red colored lens 39 covers the rear opening 44 for illuminating lens 39 for providing additional warning rearwardly of a vehicle when the brakes are applied. The wiring 45 is connected to suitable switching in a brake system 47 as is well known to those skilled in the art.

The shelf module 20 further includes a pair of spaced speaker housings 46, 48 that are formed by flow of blow molding material across the formations 20c,d. Each of the housings 46, 48 are adapted to house a speaker assembly 50 of a vehicle sound system. Each of the housings 46, 48 have a forwardly facing grill 52 thereon for covering the speaker or speakers that are mounted within the speaker assembly 50.

Another feature of the shelf module 20 is spaced integral transverse ducts 54, 56 which may contain wiring or provide air flow passages for a vehicle air conditioning system. In each case, however, the ducts define hollow box beams for structurally stiffening the shelf module 20. The duct 54 receives the wiring 45 for the rear brake lamp assembly 41 and the duct receives wiring 58 for the speaker assemblies 50. The wiring 58 is connected to the output of a sound system amplifier 59 as is well known in the art. In the case of a vehicle air condition system, a duct 57 is provided transversely across the width of the shelf module 20. Duct 57 is connected to a heating, ventilating and air conditioning system 57a of the vehicle for distributing air through an outlet 57b.

By virtue of the aforesaid construction, the unitary rear shelf module 20 and along with the rear brake light assembly 40, the speaker assemblies 50 and the ducts 54, 56, 57 can be preassembled off-site and then transported at one time to the vehicle assembly line for insertion as a unit into the passenger compartment. Consequently, the module 20 simplifies assembly requirements within an automobile assembly plant and reduce tooling costs for forming separately assembled housings for the rear brake lamp assemblies and rear speakers of motor vehicles. The unitary construction of the rear lamp housing 40, and speaker housings 46, 48 in the module 20 and the provision of wiring ducts integral with the module 20 eliminates sources of squeaks, rattles and other objectionable noises in the vehicle. Furthermore, the single unitary rear package shelf module 20 of the present invention provides a self-reinforcing construction that will combine various functions in a single unit. The integral ducts 54, 56, 57 will reinforce the module in bending along its length and torsionally therealong so as to enable the wall thickness of the construction to be reduced. The reduced wall thickness will reduce the total weight of the assembly.

Figure 1A:
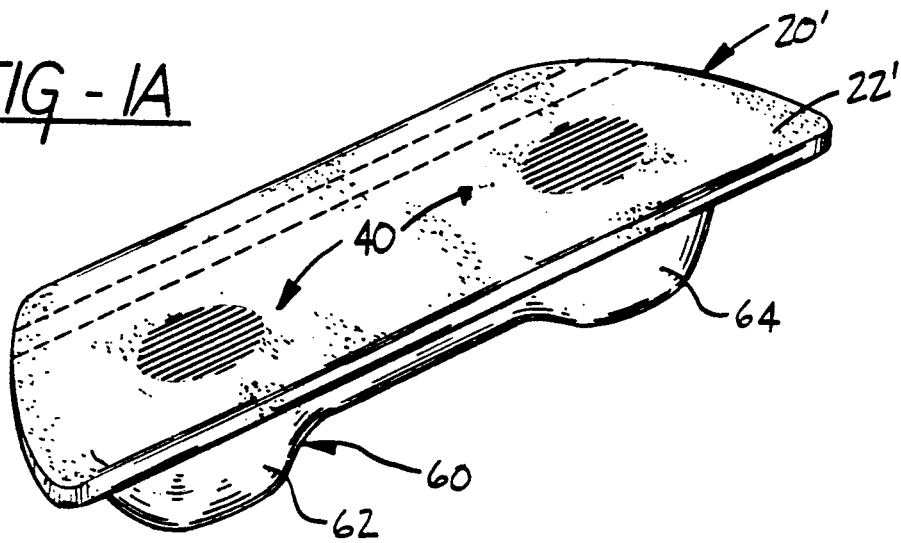
FIG. 1A is a schematic view of another embodiment of the modular shelf assembly of the present invention.

As shown in FIG. 1A, a second embodiment of the invention includes a module 20' provided with integral speaker housings 40' that are flush mounted in an upper surface 22'. An integrally formed sound system resonator 60 is located below the surface 22'. The resonator 60 is a dumbbell shaped chamber 60 having cavities 62, 64 containing each speaker 40'. In some cases the chamber 60 is formed as a separate resonator chamber for each speaker.

Figure 5:
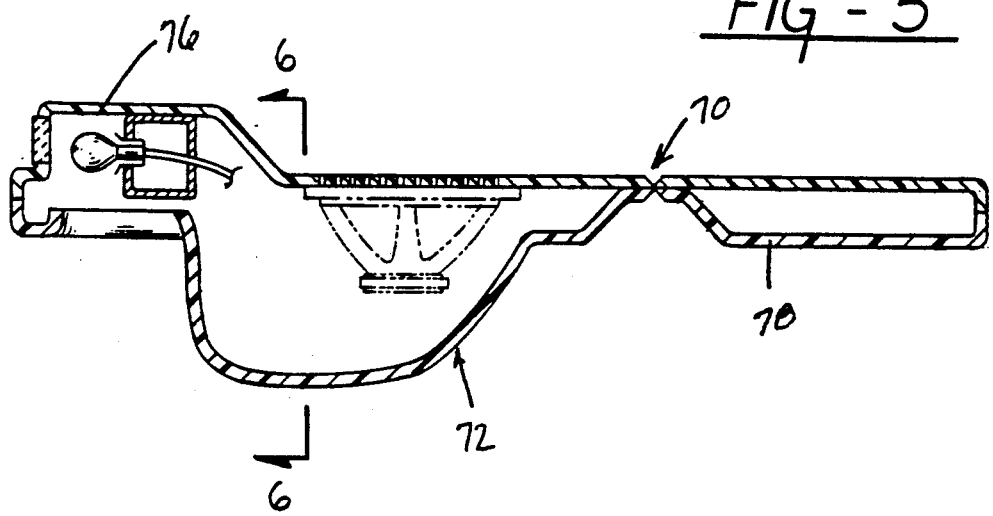
FIG. 5 is a schematic view of another embodiment of the modular shelf assembly of the present invention.
Figure 6:
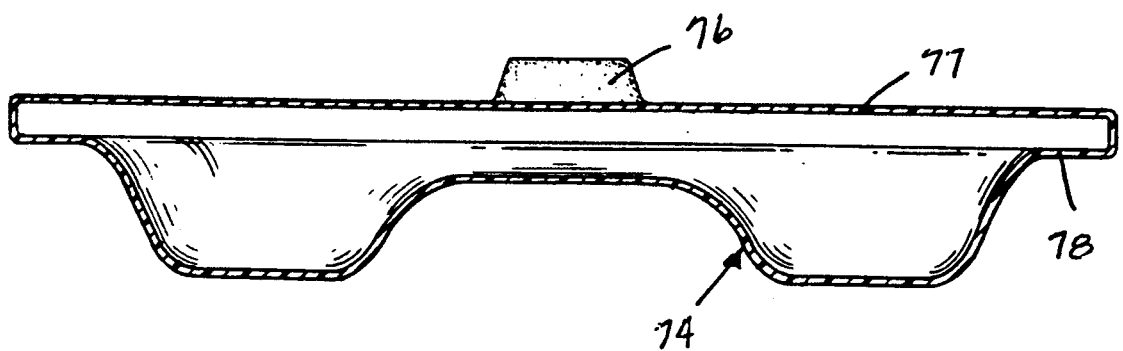
FIG. 6 is a sectional view taken along the line 6—6 of FIG. 5 looking in the direction of the arrows.
Figure 7:
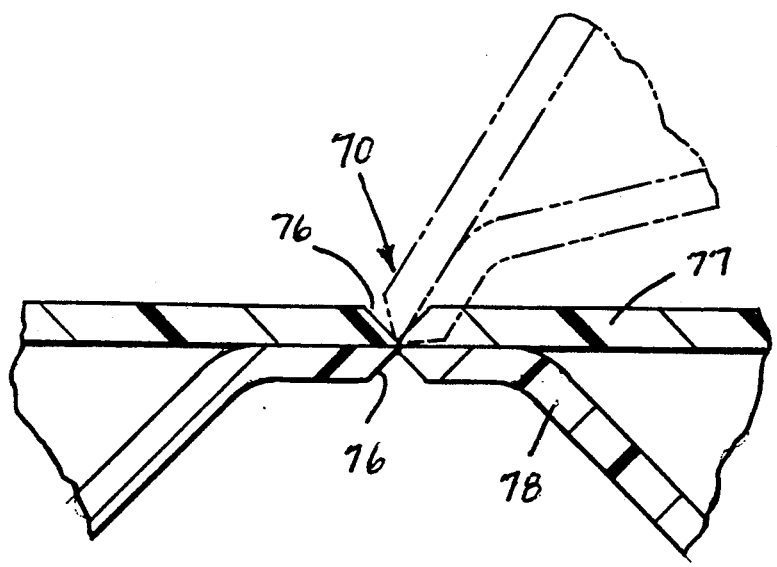
FIG. 7 is an enlarged fragmentary sectional view of the circled region 7 in FIG. 5.

As shown in FIG. 5, the blow mold may have an internal pinch off that forms a thin longitudinal integral hinge 70 in a module 72 having a blow molded dumbbell shaped resonator 74 and a rear lamp housing 76. For purposes of this embodiment, the rear light and speakers are omitted, with it being understood that such details illustrated in the earlier embodiments or other like components are suited for use in the module 72 of this embodiment. The integral hinge 70 can be formed by a V-shaped exterior styling line 76 in the outer wall 77 of the module 72. The styling line 72 is formed longitudinally of the width of the module 72 aligned with an internal V-groove 76 in the inner wall 78 of the module 72.

By virtue of this construction, a forwardly located double walled portion 80 of the module 72 can be folded back as shown in hidden line to provide access to a rear storage compartment, e.g., the trunk of a passenger car or a hidden storage compartment below the module 72.

While the present invention has been described with respect to a preferred embodiment, it should be understood that the shape, form and design illustrated herein is merely illustrative of the invention and that the illustrated embodiment is susceptible of other changes and modifications by those ordinarily skilled in the art and it is my intention to be limited neither in description nor in details to those shown and described herein, with it being understood that the invention is that encompassed within the scope of the claims appended hereto.

What is claimed is:

1. A single piece rear package shelf module for a motor vehicle comprising an upper shelf portion extending across the width of the module and from the front to the rear of the module;

said single piece rear package shelf module including a first housing portion integrally formed with said upper shelf portion; said first housing portion having a rearwardly facing opening and a brake light lens covering said opening;

said first housing portion forming an interior space within said single piece rear package shelf module for enclosing a rear brake light assembly having an energizable lamp that will light during braking to direct light through said brake light lens;

said single piece rear package shelf module including a second housing portion formed integrally of said upper shelf portion for forming an interior space within said single piece rear package shelf module for enclosing speaker components of a vehicle sound system; and ducts formed integrally of said upper shelf portion; said ducts having access openings therein in communication with said first and second interior spaces through which electrical wiring can be directed for connection to electrically energizable components of the brake light assembly and for connection to electrically energizable components of the speakers.

2. A single piece rear package shelf module for a motor vehicle comprising an upper shelf portion extending across the width of the module and from the front to the rear of the module;

said single piece rear package shelf module including a housing portion formed integrally of said upper shelf portion for forming an interior space within said single piece rear package shelf module for enclosing speaker components of a vehicle sound system; and ducts formed integrally of said upper shelf portion; said ducts having access openings therein in communication with said interior space through which electrical wiring can be directed for connection to electrically energizable components of the speakers.

3. A single piece rear package shelf module for a motor vehicle comprising an upper shelf portion extending across the width of the module and from the front to the rear of the module;

said single piece rear package shelf module including a first housing portion integrally formed with said upper shelf portion; said first housing portion having a rearwardly facing opening adapted to be covered by a brake light lens;

said first housing portion forming an interior space within said single piece rear package shelf module for enclosing a rear brake light assembly having an energizable lamp that will illuminate said brake light lens during braking;

said single piece rear package shelf module including a second housing portion formed integrally of said upper shelf portion and raised therefrom with forwardly facing opening within a passenger compartment of a vehicle and a grill member covering said forwardly facing opening; said second housing portion forming a space within said single piece rear package shelf module for enclosing speaker components of a vehicle sound system;

and ducts formed integrally of said upper shelf portion; said ducts having access openings therein in communication with said first and second interior spaces through which electrical wiring can be directed for connection to electrically energizable components of the brake light assembly and for connection to electrically energizable components of the speakers.

4. A single piece rear package shelf module for a motor vehicle comprising an upper shelf portion extending across the width of the module and from the front to the rear of the module;

said single piece rear package shelf module including a first housing portion integrally formed with said upper shelf portion and raised above said upper shelf portion; said first housing portion having a rearwardly facing opening adapted to receive a brake light lens for covering said opening;

said first housing portion forming a first interior space within said single piece rear package shelf module located above said upper shelf portion for enclosing a rear brake light assembly having an energizable lamp that will illuminate said brake light lens during vehicle braking;

said single piece rear package shelf module including a second housing portion formed integrally of said upper shelf portion for forming a second interior space within said single piece rear package shelf module for enclosing speaker components of a vehicle sound system that have outlets flush with said upper shelf portion;

and ducts formed integrally of said upper shelf portion; said ducts having access openings therein in communication with said first and second interior spaces through which electrical wiring can be directed for connection to electrically energizable components of the brake light assembly and for connection to electrically energizable components of the speakers;

said ducts extending across the width of said upper shelf portion for reinforcing said module against lengthwise bending and against torsional twisting along its length.

5. A single piece rear package shelf module for a motor vehicle comprising an upper shelf portion extending across the width of the module and from the front to the rear of the module;

said single piece rear package shelf module including a housing portion formed integrally of said upper shelf portion for forming a space within said single piece rear package shelf module for enclosing speaker components of a vehicle sound system that have outlets flush with said upper shelf portion; and ducts formed integrally of said upper shelf portion; said ducts having access openings therein in communication with said interior space through which electrical wiring can be directed for connection to electrically energizable components of the speakers;

said ducts extending across the width of said upper shelf portion for reinforcing said module against lengthwise bending and against torsional twisting along its length.

6. A single piece rear package shelf module for a motor vehicle comprising an upper shelf portion extending across the width of the module and from the front to the rear of the module;

said single piece rear package shelf module including a first housing portion integrally formed with said upper shelf portion and raised thereabove; said first housing portion having a rearwardly facing opening adapted to receive a brake light lens for covering said opening;

said first housing portion forming an interior space within said single piece rear package shelf module located above said upper shelf portion for enclosing a rear brake light assembly having an energizable lamp that will illuminate said brake light lens during braking;

said single piece rear package shelf module including a second housing portion formed integrally of said upper shelf portion and raised therefrom with a forwardly facing opening within a passenger compartment of a vehicle adapted to receive a grill member for covering said forward opening;

said second housing portion forming an interior space within said single piece rear package shelf module for enclosing speaker components of a vehicle sound system;

and ducts formed integrally of said upper shelf portion; said ducts having access openings therein in communication with said aforementioned interior spaces through which electrical wiring can be directed for connection to electrically energizable components of the brake light assembly and for connection to electrically energizable components of the speakers;

said ducts extending across the width of said upper shelf portion for reinforcing said module against lengthwise bending and against torsional twisting along its length.

7. A single piece rear package shelf module for a motor vehicle comprising an upper shelf portion extending across the width of the module and from the front to the rear of the module;

said single piece rear package shelf module including a first housing portion integrally formed with said upper shelf portion; said first housing portion having a rearwardly facing opening adapted to receive a brake light lens for covering said opening;

said first housing portion forming an interior space within said single piece rear package shelf module for enclosing a rear brake light assembly having an energizable lamp that will light during braking to direct light through said brake light lens;

said single piece rear package shelf module including a second housing portion formed integrally of said upper shelf portion for forming an interior sound resonating space within said module for enclosing speaker components of a vehicle sound system;

ducts formed integrally of said upper shelf portion; said ducts having access openings therein in communication with said aforementioned interior spaces through which electrical wiring can be directed for connection to electrically energizable components of the brake light assembly and for connection to electrically energizable components of the speakers;

said upper shelf portion having a forward portion; and mean forming an integral hinge in said upper shelf portion whereby said forward portion is foldable rearwardly to provide access below said upper shelf portion.

* * * * *